United States Patent [19]
Brown et al.

[11] 3,734,138
[45] May 22, 1973

[54] OIL OR LIKE TRANSPORTATION SYSTEM AND PIPELINE SUPPORT

[76] Inventors: Byron T. Brown, 1818 S. 16th St., Phoenix, Ariz. 85034; B. Stahmer, 902 D Street, Omaha, Nebr. 68107

[22] Filed: Mar. 26, 1971

[21] Appl. No.: 128,468

[52] U.S. Cl. ........................138/106, 248/49, 61/46
[51] Int. Cl. ............................E02d 27/46, F16l 3/00
[58] Field of Search.............................138/106, 107; 248/49, 54, 102, 350; 267/116, 118; 61/46

[56] References Cited
UNITED STATES PATENTS

| | | | |
|---|---|---|---|
| 3,026,076 | 3/1962 | Bender | 248/49 |
| 1,778,545 | 10/1930 | Allen | 248/102 X |
| 2,134,746 | 11/1938 | Allen | 248/102 |
| 3,613,380 | 10/1971 | Tarner | 248/49 |

*Primary Examiner*—William R. Cline
*Attorney*—Strauch, Nolan, Neale, Nies & Kurz

[57] ABSTRACT

An oil or like pipeline system is supported upon randomly spaced pillars each comprising a rubber or like container filled with a fluidic material such as styrofoam, sand water or the like.

6 Claims, 6 Drawing Figures

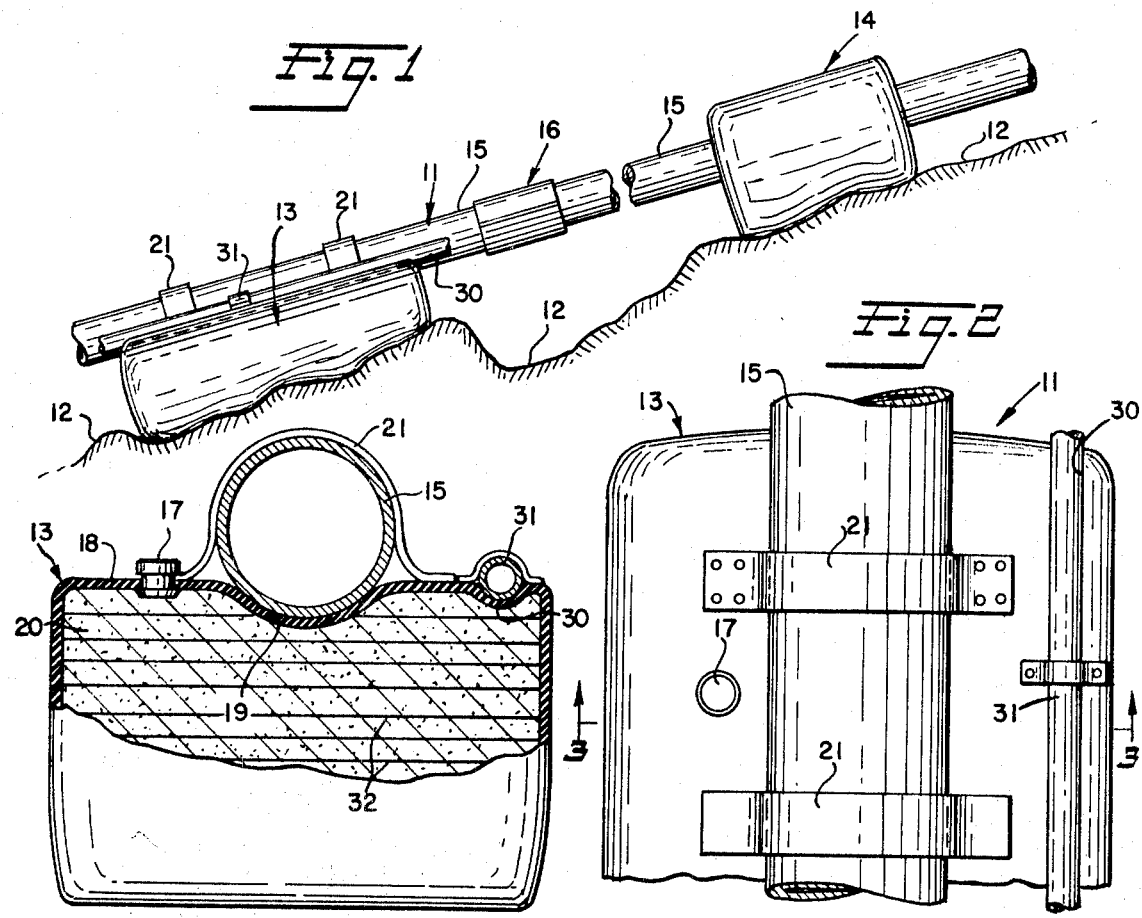

3,734,138

OIL OR LIKE TRANSPORTATION SYSTEM AND PIPELINE SUPPORT

This invention relates to the transportation of oil or the like by pipeline over earth surfaces that are either irregular, or subject to changing conditions such as melting from frozen solid to more or less fluid state and vice verse under certain climate conditions.

A particular problem of this nature is faced in building a pipeline over the surface of the tundra in Northern regions such as Canada and Alaska. It has been proposed to support the pipeline conventionally on spaced concrete pillars based on the ground. One difficulty with this is that these heavy pillars may become displaced as the ground thaws, to rupture the pipeline or leave it without support in places. Also, when the ground refreezes quickly, as it may at night even in summer, the pillars may become further or angularly displaced so that adjacent pillars may even exert opposed forces tending to rupture the line. Even when these pillars are deeply anchored, which is expensive, they are subject to sinking and changing upright position during seasonal changes at the ground level. Pillars erected under frozen ground conditions may shift when the ground thaws, and pillars erected at mud or fluid surfaces may change position when the ground freezes.

The present invention is directed to a solution of the foregoing problem by providing spaced pipeline supports that are readily installed with minimum expense upon almost any earth surface condition and maintain support of the pipeline substantially uniformly throughout the year, and such is the major object of the invention.

A further object of the invention is to provide improved pipeline support structures comprising inflatable flexible walled members adapted to be filled with a filler material in situ. The inflated member may be relatively light in weight and capable of conforming to or compensating for changing earth surface conditions while retaining substantially uniform support of the pipeline.

It is a further object of the invention to provide novel above-ground pipeline supports each consisting essentially of a normally collapsible elastomeric container inflated by introducing fluidic material such as light weight plastic particles or pellets, sand or even water for imparting adequate load bearing capacity to the container.

Of particular advantage is the filler comprising low density plastic material in the form of particles or pellets for fluidity, a preferred material according to this phase of the invention being the polystyrene composition known as styrofoam which has excellent thermal insulation properties that render it quite useful for preserving the oil temperature in the line, and which is quite stable being inert to decay or rot and does not absorb water in any material amount.

It is therefore a more specific object of the invention to provide a novel light weight pipeline support member wherein an elastomeric envelope is filled with dry particulate low density plastic such as polystyrene whereby the member sufficiently buoyant for maintaining support of the pipeline even when the ground becomes muddy or fluid.

Another object of the invention is to provide a novel pipeline joint structure wherein the adjacent ends of two abutting pipe sections are enclosed tightly within a metal collar.

Further objects of the invention or will appear as the description proceeds in connection with the appended claims and the annexed drawings.

BRIEF DESCRIPTION OF THE DRAWINGS

FIG. 1 is a generally perspective view illustrating a pipeline support system according to a preferred embodiment of the invention;

FIG. 2 is a fragmentary top view showing a preferred support member;

FIG. 3 is a section on line 3—3 of FIG. 2;

FIG. 4 is an end elevation partly broken away and in section showing another form of support member;

FIG. 5 is a fragmentary view showing a preferred form of pipe joint; and

FIG. 6 is section on line 6—6 of FIG. 5.

FIG. 1 shows an oil transporting pipeline 11 supported on the earth surface indicated at 12 by support members 13 and 14. The pipeline consists essentially of known lengths, about 27 feet, of steel pipe 15 connected end to end as by suitable joints indicated at 16. Support members 13 and 14 are located any suitable distance apart, bearing in mind such factors as snow loads, windage, the nature of the territory, etc.

Referring to FIGS. 2 and 3, support member 13 is of the conforming saddle type. It consists essentially of an inflatable flexible walled envelope, bag or like container preferably made of a suitable elastomeric material such as a synthetic rubber having an intake section 17 through which fluidic material may be introduced to inflate the support member to pipeline supporting condition.

A preferred form of support member has a top wall 18 formed with a longitudinally extending upwardly open channel or socket section 19 in which the pipe rests. The fluidic material is indicated at 20. Alternatively the channel may result from the weight of the pipe resting on the top of member 13.

In practice the support members are inflated to desired condition, and the pipeline is laid down over them, each section 15 being connected in the field. A support locating the pipeline about two feet above the earth is desired. If desired suitable fasteners, such as the flexible straps indicated at 21 in FIG. 2, may be provided to help hold the pipeline on the support members but usually the weight of pipe is adequate.

A resilient walled support member will, as shown in FIG. 3, adapt itself and its bottom to uneven ground contours and projections, so that it is usually not even necessary to clear a site for erecting it.

The fluidic material for inflating each support member is available over a wide choice. An extremely useful material is the particulate polystyrene plastic commercially known as styrofoam. This is a low density inert product having good thermal insulation properties, and it is available in loose pellets which can be blown into the interior of the support member. A support member filled with this light weight material has the great advantage that it will substantially float on water or the semi-fluid surfaces that result when the tundra surface is warmed by the sun, and thereby retain its support of the pipeline.

The fluidic material is not critical, and actually different fluidic materials may be used at different points along the pipeline to suit conditions. Where water and soft earth conditions are encountered, usually light weight particulate material such as above described is preferred. However, other materials, some available along the territory being traversed may be used.

For example, water may be introduced to inflate the support member. Water will freeze, but the resilient container wall will compensate for the sudden expansion of freezing, and the contained ice will offer even better support than the water. Before freezing the water filled support member will have adapted to the contour of the pipe and the ground beneath it. A water-filled support member may be readily repaired and refilled using any available water source. The water may thaw and refreeze as seasons change without noticeable change in the support function.

Sand is also a locally available fluidic material that is quite satisfactory and easily replenished.

In some locations, oil from the pipeline may be introduced within the support member.

Another form of inflatable support member is shown in FIG. 1 and FIG. 4. The support member 14 is annular, with an opening 22 therethrough supporting the pipe section 15 extending through it. The support member 14 has resilient walls indicated at 23, and it is inflated by filling it with a fluidic material 24 which may be the same as that used in support member 13. The lower end of support member 14 may conform to adapt to ground contour.

The invention is not limited to any particular form or shape of support member.

FIGS. 4 and 5 illustrate a good all weather pipe joint. The ends of two steel pipe sections 15 of the same diameter are forced into abutment, the adjacent external surfaces of both pipe sections are coated with a layer 26 of a suitable cement material such as an epoxy or other thermosetting resin, and the abutting ends are enclosed by a split steel collar 25 which is forced, as by a suitable hydraulic clamp, to snugly and tightly peripherally surround the abutting ends of the pipes 15. Opposite edges 27 of the collar are forced into substantial abutment and, while the clamp is maintained, a welded joint 28 is formed along edges 27 permanently securing collar 25 upon the pipes. Preferably, collar 25 is initially a thin sheet of highly flexible steel of good tensile strength. The liquid resin is now cured in situ, and it occupies the enclosed areas beneath the collar. Joint 16 is therefore pressure tight and does not leak, and it has great strength to resist rupture of the pipeline due to bending stresses at the pipeline joints. Although gas-filled support members may provide the required support strength, they are preferably not used because they will deflate if the wall leaks or is punctured, and they require pressurized gas for refilling.

As shown in FIG. 3, each support 13 may have an addition groove as at 30 for supporting another pipeline 31, such as a gas line. Also it is contemplated in some instances to provide strip or coil wire mesh inserts 32 within the envelope distributed through the fluidic material. This makes the support more resistant to fracture when struck by an ice slide or other heavy force.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An oil or like transportation system comprising a continuous pipeline and a plurality of support members spaced along and above the ground beneath said pipeline, each of said members consisting essentially of an inflatable flexible walled envelope containing a light weight fluidic load sustaining filler material, said members each being characterized by having a continuous ground engaging bottom surface that flexibly conforms to irregularities and changes in condition of the supporting ground surface and having a top surface that flexibly conforms to the contour of the pipeline surface supported thereby.

2. A ground surface based support member for an above ground oil pipeline section consisting essentially of an inflatable envelope having flexible walls and internal light weight fluidic filler material inflating it to load sustaining condition, said member being characterized by having a continuous ground engaging bottom surface that flexibly conforms to irregularities and changes in condition of the supporting ground surface and having a top surface that flexibly conforms to the contour of the pipeline surface supported thereby.

3. The support member defined in claim 2, wherein said filler material is a low density polystrene composition.

4. The support member defined in claim 3, wherein said material is in particulate or pelletized form.

5. The support member defined in claim 2, wherein the envelope is a container of elastomeric material having an inlet for introducing said filler material.

6. The support member defined in claim 5, wherein said container is formed with a recessed wall region for seating said pipeline therein.

* * * * *